United States Patent
Shahana et al.

(10) Patent No.: US 10,717,494 B2
(45) Date of Patent: Jul. 21, 2020

(54) BICYCLE MAGNETISM GENERATION DEVICE AND DISC BRAKE ADAPTER

(71) Applicant: Shimano Inc., Sakai, Osaka (JP)

(72) Inventors: Satoshi Shahana, Osaka (JP);
Tadaharu Kurotobi, Osaka (JP);
Kazuhiro Fujii, Osaka (JP); Kanako Kiyokawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/854,032

(22) Filed: Dec. 26, 2017

(65) Prior Publication Data

US 2018/0201339 A1 Jul. 19, 2018

(30) Foreign Application Priority Data

Jan. 13, 2017 (JP) .................. 2017-004720

(51) Int. Cl.
| | |
|---|---|
| *B62L 1/00* | (2006.01) |
| *F16D 65/12* | (2006.01) |
| *B62J 99/00* | (2020.01) |
| *F16D 65/02* | (2006.01) |
| *B62K 25/04* | (2006.01) |
| *B62J 45/00* | (2020.01) |
| *B62J 45/40* | (2020.01) |

(52) U.S. Cl.
CPC .............. *B62L 1/005* (2013.01); *B62J 99/00* (2013.01); *F16D 65/123* (2013.01); *F16D 65/125* (2013.01); *B60Y 2400/3012* (2013.01); *B60Y 2400/3032* (2013.01); *B60Y 2410/132* (2013.01); *B62J 45/00* (2020.02); *B62J 45/40* (2020.02); *B62K 25/04* (2013.01); *F16D 2065/1376* (2013.01); *F16D 2065/1384* (2013.01)

(58) Field of Classification Search
CPC ..... B62L 1/005; B62J 99/00; B62J 2099/002; B62J 2099/004; F16D 65/123; F16D 65/125; F16D 2065/1376; F16D 2065/1384; B60Y 2400/3012; B60Y 2400/3032; B60Y 2410/132; B62K 25/04
See application file for complete search history.

(56) References Cited

U.S. PATENT DOCUMENTS 3,522,973 A    8/1970    Klein et al.
3,626,226 A *  12/1971   Pauwels .................. G01P 3/443
                                                          310/168

(Continued)

FOREIGN PATENT DOCUMENTS

| CN | 105628957 A | 6/2016 |
| JP | 10-076988 A | 3/1998 |

(Continued)

*Primary Examiner* — Bradley T King
*Assistant Examiner* — Mahbubur Rashid
(74) *Attorney, Agent, or Firm* — .Global IP Counselors, LLP

(57) ABSTRACT

A bicycle magnetism generation device and a disc brake adapter are configured to allow a rotation state of a bicycle wheel to be detected in a suitable manner. The bicycle magnetism generation device includes a magnetism generator generating magnetism. In a state where the disc brake rotor is coupled to a hub of a bicycle, the bicycle magnetism generation device is at least partially arrangeable between the disc brake rotor and the hub.

18 Claims, 10 Drawing Sheets

(56) References Cited

U.S. PATENT DOCUMENTS

| | | | |
|---|---|---|---|
| 3,772,549 A * | 11/1973 | Cumming | B60T 8/329 |
| | | | 310/168 |
| 3,870,911 A * | 3/1975 | Toyama | B60T 8/329 |
| | | | 310/155 |
| 3,939,373 A * | 2/1976 | Roberts | B60T 8/329 |
| | | | 310/168 |
| 6,371,252 B1 | 4/2002 | Kanehisa | |
| 7,209,032 B2 * | 4/2007 | Fennel | B60C 23/043 |
| | | | 340/442 |
| 8,008,817 B2 | 8/2011 | Lamperth | |
| 8,091,418 B2 * | 1/2012 | Acker | B60C 23/0413 |
| | | | 73/146 |
| 2005/0139432 A1 | 6/2005 | Takizawa | |
| 2010/0250082 A1 | 9/2010 | King et al. | |
| 2013/0162011 A1 * | 6/2013 | Ruopp | B60T 11/16 |
| | | | 303/9.64 |
| 2016/0318575 A1 | 11/2016 | Shimoda et al. | |
| 2017/0151829 A1 * | 6/2017 | Neutsch | B60B 27/0068 |
| 2017/0151833 A1 * | 6/2017 | Neutsch | B60B 1/003 |

FOREIGN PATENT DOCUMENTS

| | | |
|---|---|---|
| JP | 2005-188704 A | 7/2005 |
| JP | 2007-1532 A | 1/2007 |
| JP | 2007-149911 A | 6/2007 |
| JP | 2007-232090 A | 9/2007 |
| JP | 3189975 U | 3/2014 |
| JP | 2014-136542 A | 7/2014 |
| JP | 2016-203932 A | 12/2016 |
| WO | 2012-017096 A1 | 2/2012 |

* cited by examiner

BICYCLE MAGNETISM GENERATION DEVICE AND DISC BRAKE ADAPTER

CROSS-REFERENCE TO RELATED APPLICATIONS

This application claims priority to Japanese Patent Application No. 2017-004720, filed on Jan. 13, 2017. The entire disclosure of Japanese Patent Application No. 2017-004720 is hereby incorporated herein by reference.

BACKGROUND

Field of the Invention

The present invention relates to a bicycle magnetism generation device and a disc brake adapter.

Background Information

A technique for detecting a rotation state of a wheel is known in the art. For example, Japanese Laid-Open Patent Publication No. 10-076988 (patent document 1) discloses a technique to detect a wheel rotation state. In particular, the patent document 1 discloses a magnet that is attached to a spoke of the wheel in which the magnet is detected by a sensor.

SUMMARY

One object of the present invention is to provide a bicycle magnetism generation device and a disc brake adapter that can be used to detect the rotation state of a bicycle wheel in a suitable manner.

In accordance with a first aspect of the present invention, a bicycle magnetism generation device includes a magnetism generator generating magnetism. In a state where a disc brake rotor is coupled to a hub of a bicycle, the bicycle magnetism generation device is configured to be at least partially arrangeable between the disc brake rotor and the hub. With the bicycle magnetism generation device according to the first aspect, the bicycle magnetism generation device can be arranged at a position close to the wheel. This arrangement limits contact of the bicycle magnetism generation device with foreign matter, such as pebbles and sand, part of the body of the rider, and the like. Thus, the bicycle magnetism generation device can be used to detect the rotation state of the bicycle wheel in a suitable manner. Further, the bicycle magnetism generation device can be at least partially arranged between the disc brake rotor and the hub to restrict movement of the bicycle magnetism generation device toward the disc brake rotor and toward the hub.

In accordance with a second aspect of the present invention, the bicycle magnetism generation device according to the first aspect further includes a base supporting the magnetism generator. The base includes at least a first portion configured to be at least partially arrangeable between the disc brake rotor and the hub in a state where the disc brake rotor is coupled to the hub. With the bicycle magnetism generation device according to the second aspect, the magnetism generator is not arranged between the disc brake rotor and the hub, and the base is arranged between the disc brake rotor and the hub. Thus, the base can easily be shaped to facilitate arrangement between the base and the disc brake rotor.

In accordance with a third aspect of the present invention, the bicycle magnetism generation device according to the second aspect is configured so that the first portion of the base is configured to be arrangeable between the disc brake rotor and the hub in a direction parallel to an axial direction of the hub in a state where the disc brake rotor is coupled to the hub. With the bicycle magnetism generation device according to the third aspect, the disc brake rotor and the hub restrict movement of base in a direction parallel to the axial direction of the hub.

In accordance with a fourth aspect of the present invention, the bicycle magnetism generation device according to the third aspect is configured so that in a state where the disc brake rotor is coupled to the hub, the first portion of the base includes a first contact surface that contacts the disc brake rotor and a second contact surface that contacts the hub. With the bicycle magnetism generation device according to the fourth aspect, the first contact surface and second contact surface of the first portion respectively contact the disc brake rotor and the hub. This minimizes enlargement of the bicycle in the axial direction of the hub in comparison with when gaps are formed between the first portion and the disc brake rotor and the first portion and the hub. Further, the first portion is held between the disc brake rotor and the hub. Thus, the base can be stably coupled to the hub.

In accordance with a fifth aspect of the present invention, the bicycle magnetism generation device according to the fourth aspect is configured so that the first portion of the base includes at least part of a plate member. With the bicycle magnetism generation device according to the fifth aspect, the plate member can include the first contact surface and the second contact surface.

In accordance with a sixth aspect of the present invention, the bicycle magnetism generation device according to the fifth aspect is configured so that the plate member includes an annular portion allowing for insertion of a part of the hub in an axial direction of the hub, and the first contact surface and the second contact surface are defined on the annular portion. With the bicycle magnetism generation device according to the sixth aspect, in a state where part of the hub is inserted through the annular portion of the plate member, the first contact surface and the second contact surface can respectively contact the disc brake rotor and the hub.

In accordance with a seventh aspect of the present invention, the bicycle magnetism generation device according to the fifth aspect is configured so that the plate member includes an annular portion and a projection. The annular portion allows for insertion of a part of the hub in an axial direction of the hub. The projection projects inward in a radial direction from an inner circumferential portion of the annular portion. The first contact surface and the second contact surface are defined on the projection. With the bicycle magnetism generation device according to the seventh aspect, the projection includes the first contact surface and the second contact surface. Thus, the first contact surface and the second contact surface can be decreased in area.

In accordance with an eighth aspect of the present invention, the bicycle magnetism generation device according to the seventh aspect is configured so that the projection is one of a plurality of projections spaced apart by an interval in a circumferential direction of the annular portion. With the bicycle magnetism generation device according to the eighth aspect, there are a plurality of projections. This reduces the force applied to each projection.

In accordance with a ninth aspect of the present invention, the bicycle magnetism generation device according to any one of the fifth to eighth aspects is configured so that at least one of the first contact surface and the second contact surface is planar. With the bicycle magnetism generation device according to the ninth aspect, at least one of the first contact surface and the second contact surface has a simple structure.

In accordance with a tenth aspect of the present invention, the bicycle magnetism generation device according to the seventh or eighth aspect is configured so that the projection includes a leaf spring, and the first contact surface and the second contact surface are provided on the leaf spring. With the bicycle magnetism generation device according to the tenth aspect, the leaf spring stably supports the bicycle magnetism generation device between the disc brake rotor and the hub.

In accordance with an eleventh aspect of the present invention, the bicycle magnetism generation device according to any one of the fifth to tenth aspects is configured so that the plate member includes a hole allowing for insertion of a coupling member coupling the disc brake rotor and the hub. With the bicycle magnetism generation device according to the eleventh aspect, in a state where the coupling member is inserted through the hole of the plate member, the first contact surface and the second contact surface can respectively contact the disc brake rotor and the hub.

In accordance with a twelfth aspect of the present invention, the bicycle magnetism generation device according to any one of the fifth to eleventh aspects is configured so that the plate member has a thickness selected from a range of 0.2 mm or greater and 1.5 mm or less. With the bicycle magnetism generation device according to the twelfth aspect, the plate member can be formed to have a suitable thickness. The thickness of the plate member is 1.5 mm or less. Thus, even when arranged between the conventional hub and the disc brake rotor, the displaced amount of the position of the disc brake rotor can be minimized relative to the hub in the axial direction of the hub. The thickness of the plate member is 0.2 mm or greater. Thus, the strength of the plate member is not low.

In accordance with a thirteenth aspect of the present invention, the bicycle magnetism generation device according to any one of the second to twelfth aspects is configured so that the base further includes a holder that holds the magnetism generator. With the bicycle magnetism generation device according to the thirteenth aspect, the holder stably holds the magnetism generator.

In accordance with a fourteenth aspect of the present invention, the bicycle magnetism generation device according to the thirteenth aspect is configured so that the base further includes a second portion arranged outward in a radial direction of the first portion with respect to a rotational axis of the hub in a state where the first portion of the base is arranged between the disc brake rotor and the hub with the disc brake rotor coupled to the hub. The holder is provided on the second portion. With the bicycle magnetism generation device according to the fourteenth aspect, the magnetism generator is located at a position separated from the hub. This increases the freedom of arrangement of the sensor that detects magnetism of the magnetism generator.

In accordance with a fifteenth aspect of the present invention, the bicycle magnetism generation device according to the fourteenth aspect is configured so that the holder projects toward the disc brake rotor in a state where the first portion of the base is arranged between the disc brake rotor and the hub with the disc brake rotor coupled to the hub. With the bicycle magnetism generation device according to the fifteenth aspect, the magnetism generator can be located near the bicycle body. This allows a sensor to easily detect the magnetism of the magnetism generator.

In accordance with a sixteenth aspect of the present invention, the bicycle magnetism generation device according to any one of the thirteenth to fifteenth aspects is configured so that the holder includes an accommodation portion that accommodate the magnetism generator. With the bicycle magnetism generation device according to the sixteenth aspect, the accommodation portion is accommodated in the magnetism generator. This protects the magnetism generator from foreign matter such as pebbles and sand.

In accordance with a seventeenth aspect of the present invention, the bicycle magnetism generation device according to the sixteenth aspect is configured so that the accommodation portion accommodates the magnetism generator so that the magnetism generator is unexposed from an end at a side of the disc brake rotor. With the bicycle magnetism generation device according to the seventeenth aspect, the magnetism generator is concealed in a view taken from an outer side in a widthwise direction of the bicycle. Thus, an outer design can be employed without being affected by the magnetism generator.

In accordance with an eighteenth aspect of the present invention, the bicycle magnetism generation device according to any one of the thirteenth to seventeenth aspects is configured so that the disc brake rotor includes a through hole extending through the disc brake rotor in a direction a rotational axis of the disc brake rotor extends, and the holder is configured to be at least partially arrangeable in the through hole. With the bicycle magnetism generation device according to the eighteenth aspect, the through hole of the disc brake rotor can be used for the arrangement of the magnetism generator. Further, the holder is arranged in the through hole of disc brake rotor to arrange the magnetism generator near the bicycle body. This allows the sensor for detecting the magnetism of the magnetism generator to easily detect magnetism.

In accordance with a nineteenth aspect of the present invention, the bicycle magnetism generation device according to the eighteenth aspect is configured so that the disc brake rotor includes a first surface facing toward the base and a second surface at an opposite side of the first surface. In a state where the disc brake rotor is coupled to the hub, an end of the holder at a side of the disc brake rotor in a direction parallel to an axial direction of the hub is configured to be located toward the first surface from the second surface. With the bicycle magnetism generation device according to the nineteenth aspect, the holder does not project outward from the second surface in the widthwise direction of the bicycle. This arrangement limits contact of the holder with pebbles and sand.

In accordance with a twentieth aspect of the present invention, the bicycle magnetism generation device according to any one of the first to nineteenth aspects is configured so that the magnetism generator includes at least one permanent magnet. With the bicycle magnetism generation device according to the twentieth aspect, the magnetism generator can be easily formed with a permanent magnet.

In accordance with a twenty-first aspect of the present invention, a bicycle magnetism generation device includes a magnetism generator that generates magnetism and a base that supports the magnetism generator. In a state where a disc brake rotor including a through hole extending in a direction that a rotational axis extends is coupled to a hub of a bicycle, at least one of the magnetism generator and the base is configured to be at least partially arrangeable in the through hole. With the bicycle magnetism generation device according to the twenty-first aspect, the through hole of the disc brake rotor can be used for the arrangement of the magnetism generator. Thus, the bicycle magnetism generation device can be used in a suitable manner to detect the rotation state of the bicycle wheel.

In accordance with a twenty-second aspect of the present invention, a disc brake adapter that is annular and configured to contact the first contact surface of the bicycle magnetism generation device according to any one of the seventh, eighth, and tenth aspects. The disc brake adapter includes an inner circumferential portion and an outer circumferential portion. The inner circumferential portion is configured to be coupled to an outer circumferential portion of a hub of a bicycle, and configured to contact a first contact surface of a base member of a bicycle magnetism generation device. The outer circumferential portion is configured to be connected to a disc brake rotor body. The inner circumferential portion includes a groove to receive a projection projecting inward in a radial direction from an inner circumferential portion of an annular plate member of the base between the inner circumferential portion and the hub in a state where the inner circumferential portion is coupled to the hub. With the disc brake adapter according to the twenty-second aspect, the first contact surface contacts the disc brake adapter with the first portion arranged in the groove to restrict movement of the base relative to the hub. Thus, the bicycle magnetism generation device can be used in a suitable manner to detect the rotation state of the bicycle wheel.

In accordance with a twenty-third aspect of the present invention, the disc brake adapter according to the twenty-second aspect is configured so that the groove has a width of 2 mm or greater in a circumferential direction of the disc brake adapter. With the disc brake adapter according to the twenty-third aspect, the groove can be formed with a suitable size while obtaining the strength of a projection arranged in the groove.

In accordance with a twenty-fourth aspect of the present invention, the disc brake adapter according to the twenty-second or twenty-third aspect is configured so that the groove has a depth selected from a range of 0.1 mm or greater and 2 mm or less. With the disc brake adapter according to the twenty-fourth aspect, the groove can be formed with a suitable depth without reducing the strength of the disc brake adapter.

The bicycle magnetism generation device and disc brake adapter can be used to detect the rotation state of a bicycle wheel in a suitable manner.

BRIEF DESCRIPTION OF THE DRAWINGS

Referring now to the attached drawings, which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle magnetism generation device 50 in accordance with a first embodiment will now be described with reference to FIGS. 1 to 6. The bicycle magnetism generation device 50 will hereafter simply be referred to as the magnetism generation device 50.

The bicycle magnetism generation device 50 can be arranged on a bicycle B. The bicycle B includes a bicycle body F, a hub 10 supported by an end portion of the bicycle body F, a disc brake rotor 20 and a magnetism detection sensor S.

Figure 2:
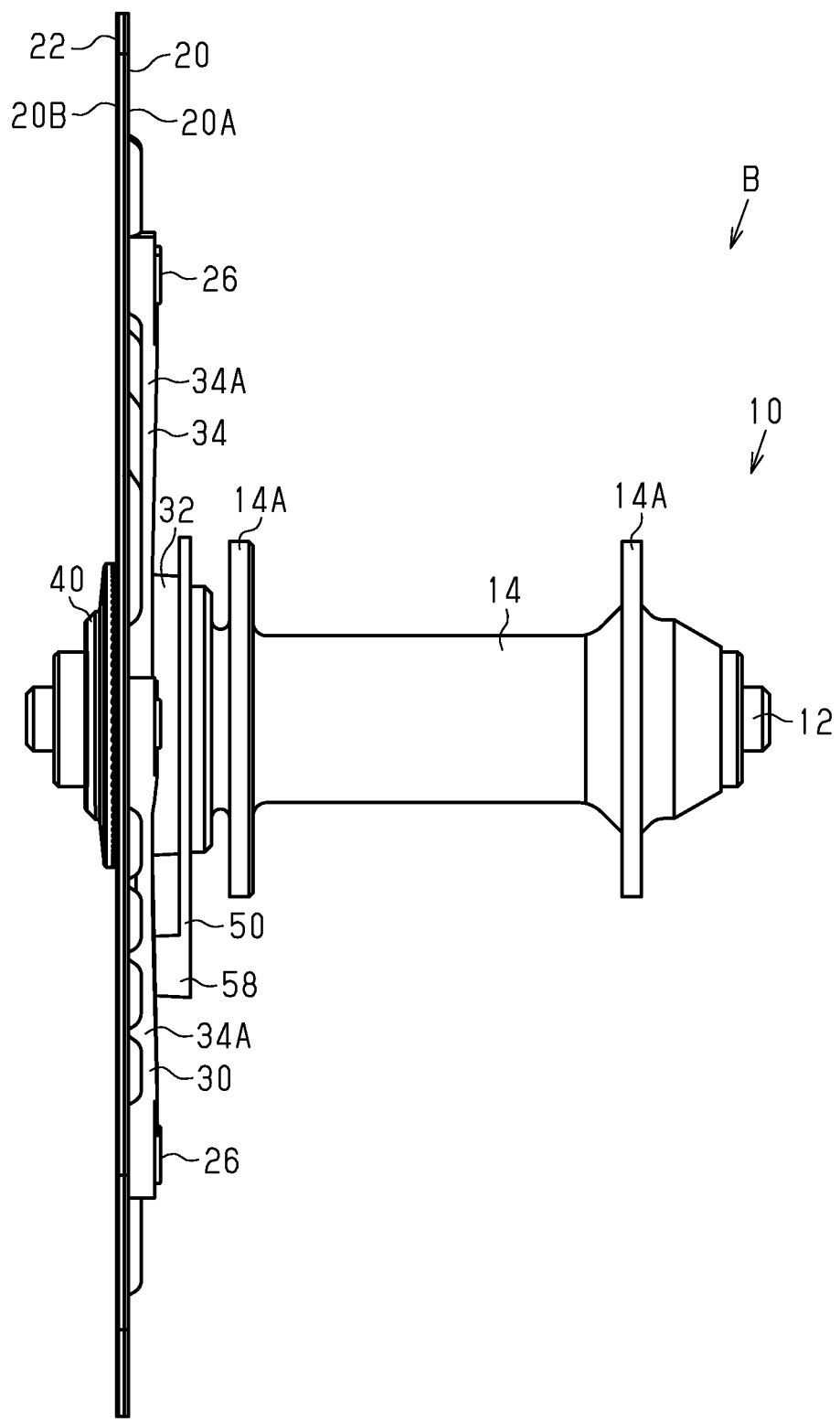
FIG. 2 is a front elevational view of the bicycle magnetism generation device, the disc brake rotor and the hub shown in FIG. 1.
Figure 4:
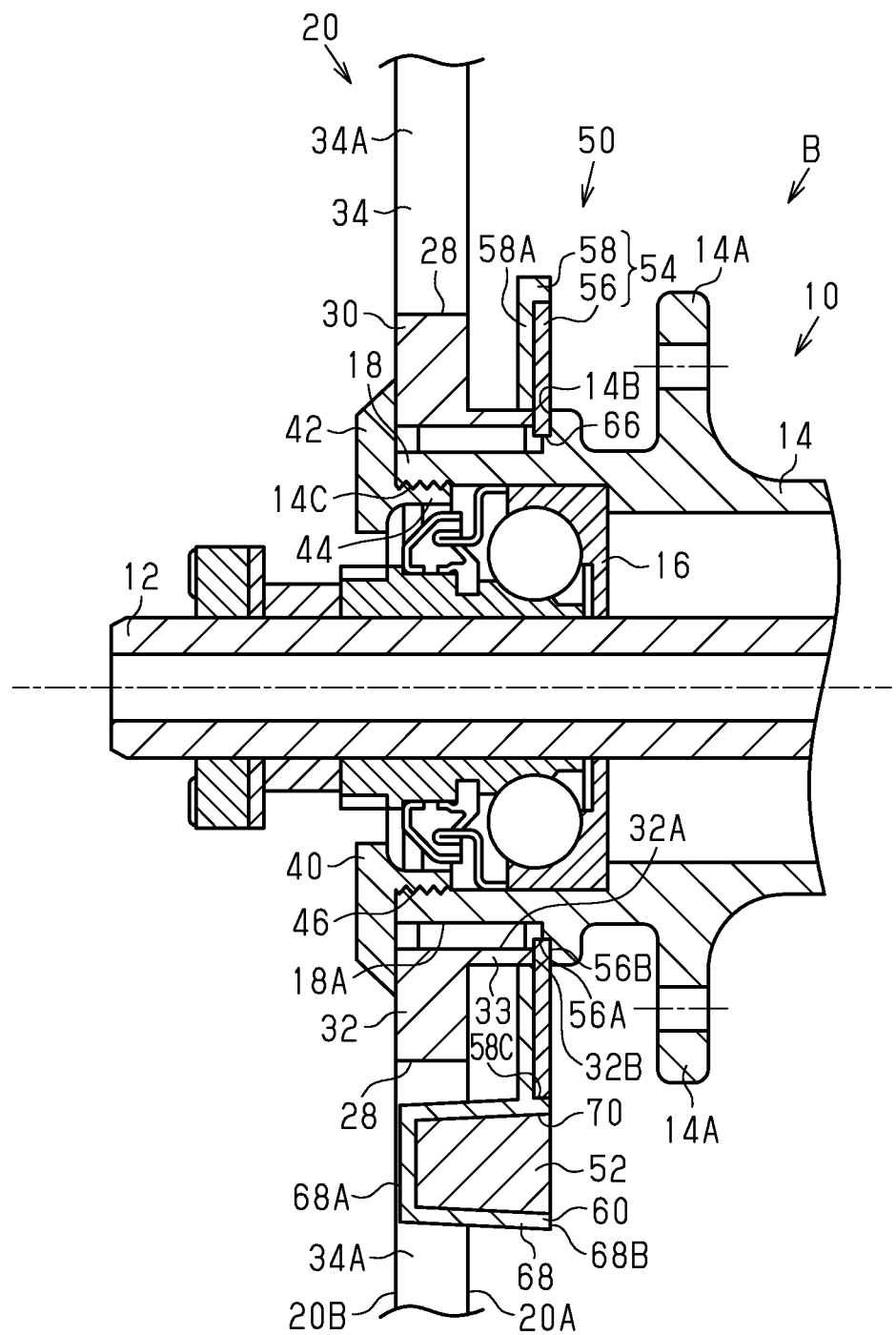
FIG. 4 is a partial longitudinal cross-sectional view of the hub, the disc brake rotor and the bicycle magnetism generation device taken along section line 4-4 in FIG. 1.

As shown in FIG. 2, the hub 10 includes a hub axle 12, a hub shell 14 and a pair of bearings 16 (only one shown in FIG. 4). The hub 10 shown in FIG. 2 is a front hub. However, the hub 10 can be a rear hub. In a case in which the hub 10 is a rear hub, a freewheel body (not shown) is further included.

In a state of use, the hub axle 12 is supported by the bicycle body F (FIG. 1) in a non-rotatable manner. The hub axle 12 is supported by the bicycle body F with its two axial ends contacting the bicycle body F. The hub axle 12 is hollow. A wheel fixing member (now shown) extends through the hub axle 12 and fixes the hub axle 12 to the bicycle body F. As shown in FIG. 4, the hub shell 14 is supported by the hub axle 12. The hub shell 14 is rotatable relative to the hub axle 12. The circumferential portion of the hub shell 14 includes a pair of spoke attaching portions 14A used to attach the spokes (not shown) of the bicycle B. The spoke attaching portions 14A are spaced apart in the axial direction of the hub axle 12, and are formed near the two axial ends of the hub shell 14. The bearings 16 are provided between the hub axle 12 and the hub shell 14. In a case in which the hub 10 is a rear hub, a freewheel body is rotatably supported by the hub axle 12. The freewheel body is provided beside the hub shell 14 in the axial direction of the hub axle 12. The freewheel body is coupled by a one-way clutch to the hub shell 14. An input body (not shown) is attachable to and removable from the freewheel body. The input body includes one or more sprockets (not shown) or pulleys (not shown). Rotation of a crank (not shown) is transmitted to the input body. Rotation of the input body around the hub axle 12 in a first direction results in the transmission of torque via the one-way clutch to the hub shell 14. An internal geared hub that changes the rotation speed of the input body and transmits the rotation to the hub shell can be provided between the input body and the hub shell 14.

Figure 1:
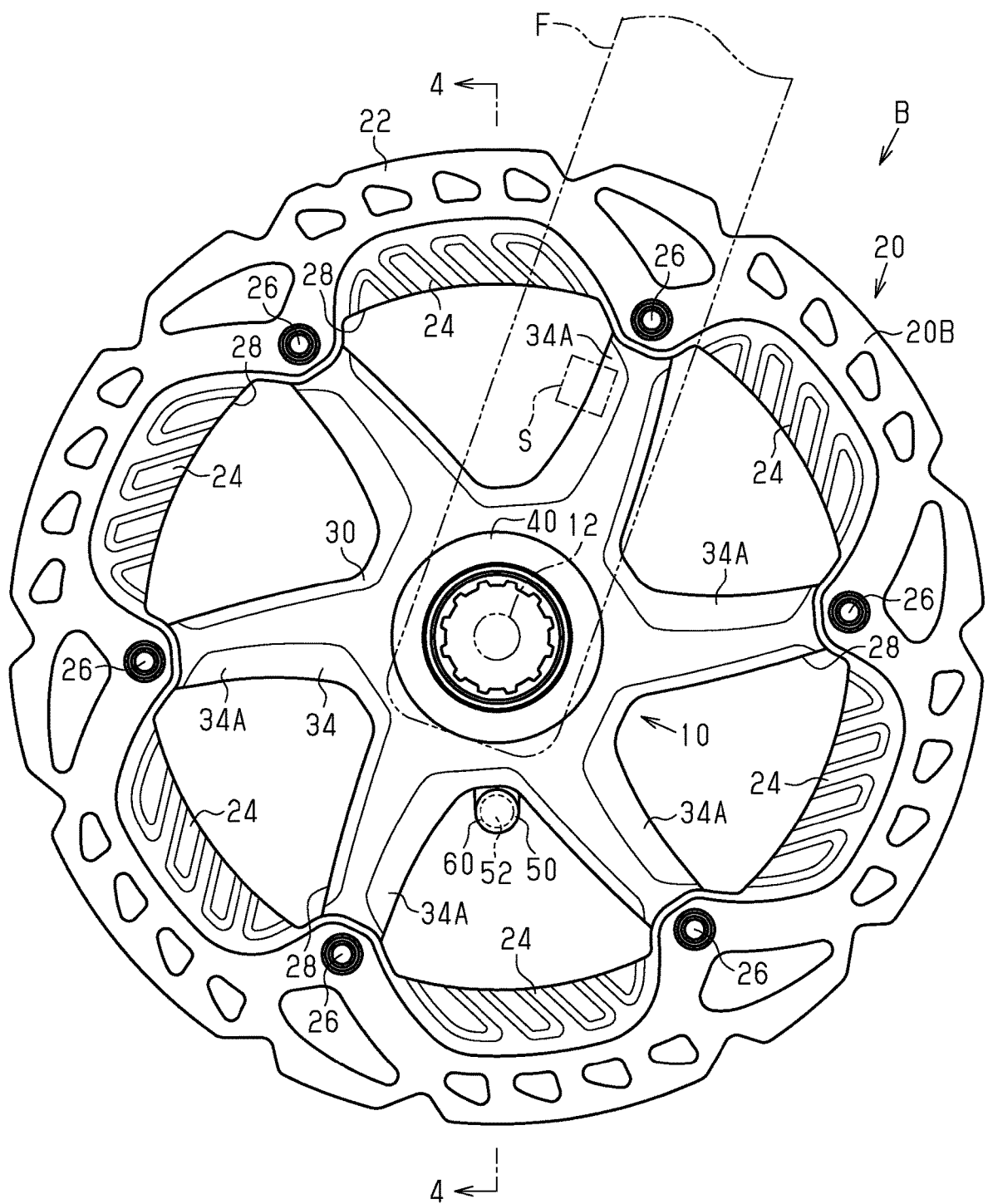
FIG. 1 is a side elevational view showing a bicycle hub having a disc brake rotor, which includes a disc brake adapter, and a bicycle magnetism generation device in accordance with a first embodiment.

As shown in FIG. 1, the disc brake rotor 20 includes a main body 22, a plurality of cooling portions 24, and a disc brake adapter 30. The main body 22 is discoid and configured to contact brake pads of a disc brake caliper (not shown). The cooling portions 24 are provided on an inner circumferential portion of the main body 22. The cooling portions 24 include fins to efficiently cool the main body 22.

Figure 3:
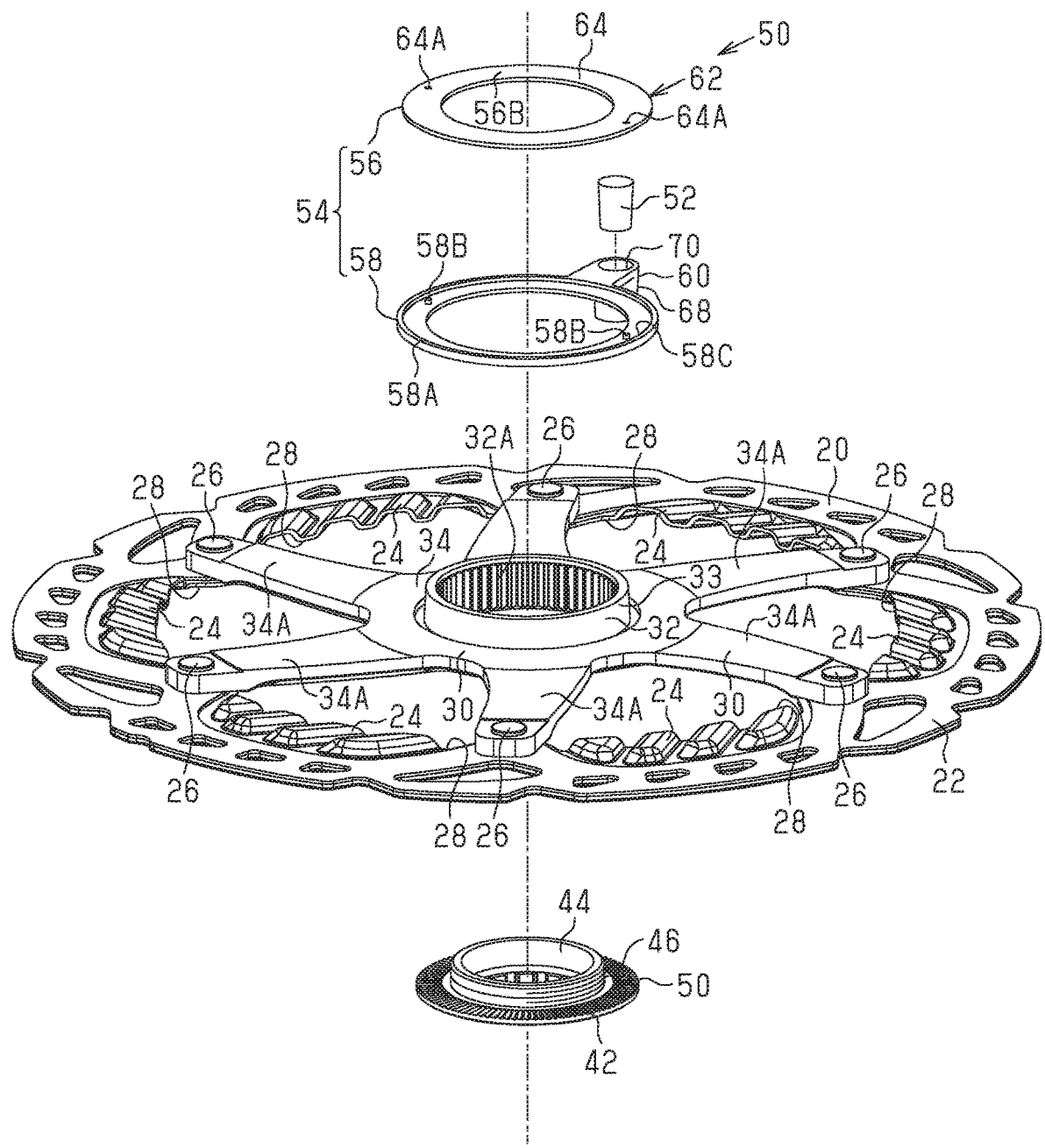
FIG. 3 is an exploded perspective view of the bicycle magnetism generation device and the disc brake rotor that are shown in FIG. 1.

Referring to FIG. 3, the disc brake adapter 30 is configured to contact a first contact surface 56A of the magnetism generation device 50. The disc brake adapter 30 is annular. Further, the disc brake adapter 30 is located inward in the radial direction from the main body 22. The disc brake adapter 30 includes an inner circumferential portion 32 and an outer circumferential portion 34. The inner circumferential portion 32 is tubular. The inner circumferential portion 32 includes a projection 33 that projects toward the hub shell 14. As shown in FIG. 4, the inner circumferential portion 32 can be coupled to an outer circumferential portion 18 of the hub 10 of the bicycle B. More specifically, splines 32A formed on the inner circumferential portion 32 are engaged with splines 18A formed on the outer circumferential portion 18 at an axial end of the hub shell 14. The splines 32A and the splines 18A extend parallel to the axial direction of the hub axle 12.

As shown in FIG. 3, the outer circumferential portion 34 can be coupled to the main body 22 of the disc brake rotor 20. The outer circumferential portion 34 includes a plurality of arms 34A extending outward in the radial direction from the inner circumferential portion 32. The radially outer ends of each of the arms 34A is connected to the main body 22 by a connection member 26. The connection members 26 can connect the main body 22 to the disc brake adapter 30 in a non-removable manner or in a removable manner. In one example, each of the connection members 26 includes a rivet. In another example, each of the connection members 26 includes a bolt.

The disc brake rotor 20 has a plurality of through holes 28. The through holes 28 extend through the disc brake rotor 20 in a direction parallel to the rotational axis of the disc brake rotor 20. In the illustrated embodiment, each of the through holes 28 is defined by two adjacent ones of the arms 34A and one of the cooling portions 24. In another example, the through holes 28 extend through the main body 22 or the outer circumferential portion 34 of the disc brake adapter 30.

As shown in FIG. 2, the disc brake rotor 20 is fixed to the hub 10 by a fixing member 40 that couples the disc brake rotor 20 and the hub 10. The disc brake rotor 20 rotates integrally with the hub shell 14 of the hub 10. More specifically, in a state where the splines 18A formed on the outer circumferential portion of the hub shell 14 and shown in FIG. 4 are fitted to the splines 32A of the disc brake rotor 20, the disc brake rotor 20 is held between the hub 10 and the fixing member 40 to couple the disc brake rotor 20 to the hub 10. The fixing member 40 includes a round ring 42 and a projection 44. The projection 44 projects from the ring 42 in the axial direction of the disc brake rotor 20. The projection 44 projects from an inner circumferential portion of the ring 42. The projection 44 is tubular. The projection 44 includes an outer circumferential portion defining a male threaded portion 46. The hub shell 14 of the hub 10 includes an inner circumferential portion that defines a female threaded portion 14C. The male threaded portion 46 of the projection 44 is configured to be engageable with the female threaded portion 14C. An inner circumferential portion of at least one of the ring 42 and the projection 44 can include a tool engagement portion that allows for engagement of a tool. If an outer circumferential portion of the hub shell 14 includes a male threaded portion to fix the fixing member 40, the fixing member 40 can include an inner circumferential portion defining a female threaded portion and an outer circumferential portion defining a tool engagement portion.

As shown in FIG. 3, the magnetism generation device 50 includes a magnetism generator 52. In one example, the bicycle magnetism generation device 50 further includes a base 54. As shown in FIG. 4, in a state where the disc brake rotor 20 is coupled to the hub 10 of the bicycle B, the magnetism generation device 50 is configured to be at least partially arranged between the disc brake rotor 20 and the hub 10.

The magnetism generator 52 shown in FIG. 3 generates magnetism. The magnetism generator 52 includes at least one permanent magnet. In the illustrated embodiment, the magnetism generator 52 is cylindrical. The magnetism generator 52 can have the form of a polygonal post or the form of a plate.

The base 54 includes at least a first portion 56. In the illustrated embodiment, the base 54 further includes a second portion 58 and a holder 60. The base 54 supports the magnetism generator 52. As shown in FIG. 4, the first portion 56 is configured to be located between the disc brake rotor 20 and the hub 10 in a state where the disc brake rotor 20 is coupled to the hub 10. The first portion 56 of the base 54 is configured to be at least partially arranged between the disc brake rotor 20 and the hub 10 in a direction parallel to the axial direction of the hub 10 in a state where the disc brake rotor 20 is coupled to the hub 10.

The first portion 56 of the base 54 includes the first contact surface 56A and a second contact surface 56B. The base 54 includes a plate member 62. The first portion 56 includes at least part of the plate member 62.

The plate member 62 includes a first annular portion 64 allowing for the insertion of part of the hub 10 in an axial direction of the hub 10. The first annular portion 64 corresponds to "the annular portion allowing for insertion of part of the hub 10 in an axial direction of the hub 10." Preferably, the first annular portion 64 is formed to be ring-shaped. In one example, the first annular portion 64 includes the entire plate member 62. The first portion 56 is annular and defined by an inner circumferential portion of the first annular portion 64. The first annular portion 64 continuously extends around the hub axle 12. The first annular portion 64 includes the first contact surface 56A and the second contact surface 56B. The plate member 62 has a thickness selected from the range of 0.2 mm or greater and 1.5 mm of less. The thickness of the plate member 62 is preferably selected from the range of 0.2 mm or greater and 0.8 mm of less. The thickness of the plate member 62 is further preferably selected from the range of 0.2 mm or greater and 0.5 mm or less. The plate member 62 includes a hole 66 allowing for the insertion of part of the hub 10. The hole 66 is formed including the center of the first annular portion 64. The hole 66 has a diameter that is slightly larger than that of the splines 18A.

At least one of the first contact surface 56A and the second contact surface 56B is planar. In one example, the first contact surface 56A and the second contact surface 56B are both planar. The first contact surface 56A and the second contact surface 56B are defined by an inner circumferential part of the first annular portion 64. The first contact surface 56A and the second contact surface 56B extend over a predetermined range in the radial direction from the inner circumferential edge of the first annular portion 64. In a state where the disc brake rotor 20 is coupled to the hub 10, the first contact surface 56A contacts the disc brake rotor 20. More specifically, the first contact surface 56A contacts a first end 32B of the inner circumferential portion 32 of the disc brake rotor 20 at a side located toward the hub shell 14. In a state where the disc brake rotor 20 is coupled to the hub 10, the second contact surface 56B contacts the hub 10. An outer circumferential portion of the hub shell 14 at one end in the direction in which the hub axle 12 extends includes a protrusion 14B located between the splines 18A and the spoke attaching portions 14A adjacent to the splines 18A. The protrusion 14B projects outward in the radial direction from the hub shell 14. The protrusion 14B can extend continuously or non-continuously around the hub axle 12. When the protrusion 14B extends continuously around the hub axle 12, the protrusion 14B is annular. More specifically, the second contact surface 56B contacts the protrusion 14B of the hub shell 14. The male threaded portion 46 of the fixing member 40 is engaged with the female threaded portion 14C of the hub shell 14 so that the first portion 56 is held between the disc brake rotor 20 and the hub shell 14 with the first contact surface 56A contacting the disc brake rotor 20 and the second contact surface 56B contacting the hub shell 14.

In a state where the disc brake rotor 20 is coupled to the hub 10 with the first portion 56 of the base 54 located between the disc brake rotor 20 and the hub 10, the second portion 58 is located outward in the radial direction from the first portion 56 with respect to the rotational axis of the hub 10. As shown in FIG. 3, the second portion 58 includes a second annular portion 58A having an outer diameter that is larger than that of the first portion 56. The second annular portion 58A is configured to allow for coupling of the first portion 56. The second annular portion 58A and the first annular portion 64 are arranged to be coaxial with each other. Preferably, the second annular portion 58A is formed to be ring-shaped. The second annular portion 58A has an inner diameter that is larger than that of the first annular portion 64. The second annular portion 58A is supported by an outer circumferential portion of the first annular portion 64. Preferably, the second annular portion 58A includes a recess 58C to receive the outer circumferential portion of the first annular portion 64. The recess 58C of the second annular portion 58A includes a pair of projections 58B. The projections 58B are insertable into a pair of recesses 64A of the first annular portion 64. Engagement of the recesses 64A with the projections 58B restricts relative movement of the first portion 56 and the second portion 58 about the hub axle 12. The recesses 64A include through holes or blind holes. The second annular portion 58A and the first annular portion 64 are fixed together by, for example, applying an adhesive agent or by performing welding. The second annular portion 58A and the first annular portion 64 are fixed to each other by coupling members such as bolts and rivets. The first annular portion 64 can include a recess, and the second annular portion 58A can include a projection fitted into the recess of the first annular portion 64. Further, the recesses 64A and the projections 58B can be omitted so that the first annular portion 64 and the second annular portion 58A are planar. The recess 58C of the second annular portion 58A can be omitted.

Figure 5:
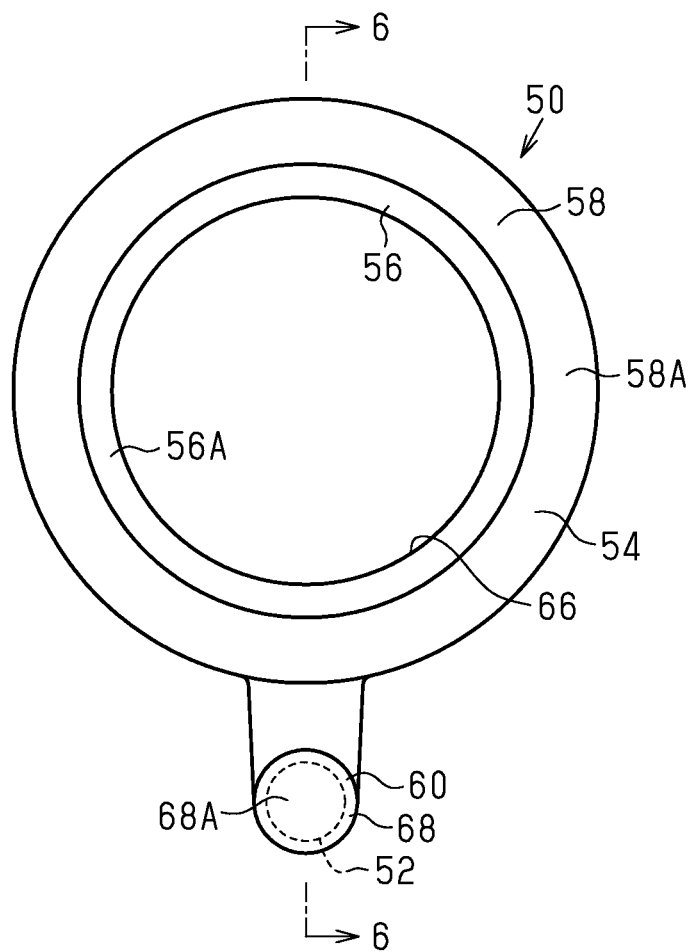
FIG. 5 is a side elevational view of the bicycle magnetism generation device shown in FIG. 1.
Figure 6:
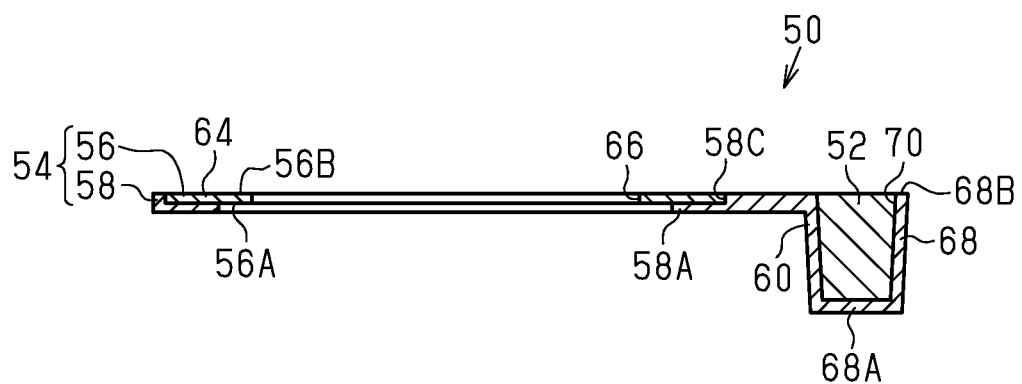
FIG. 6 is a cross-sectional view of the bicycle magnetism generation device taken along section line 6-6 in FIG. 5.

As shown in FIGS. 5 and 6, in a state where the second annular portion 58A and the first annular portion 64 are coupled together, the inner circumferential portion of the first annular portion 64 projects inward in the radial direction from the second annular portion 58A. The part of the first annular portion 64 projecting inward in the radial direction from the second annular portion 58A defines the first contact surface 56A and the second contact surface 56B. The first portion 56 and the second portion 58 can include different materials. In one example, the first portion 56 and the first annular portion 64 are formed from a material having a higher rigidity than the second portion 58. Preferably, the first portion 56 is formed from a metal material. In one example, the material of the second portion 58 is selected from materials having a lower thermal conductivity than the first portion 56. Preferably, the second portion 58 is formed from a resin material. By forming the first portion 56 and the second portion 58 from different materials, the heat transmitted to the magnetism generator 52 can be minimized while obtaining the required strength. The first portion 56 and the second portion 58 can be formed integrally with each other as a one-piece member. In such a case, the first portion 56 and the second portion 58 can be formed from a metal material or a resin material.

The holder 60 is provided on the second portion 58. The holder 60 is attached to an outer circumferential portion of the second portion 58. The holder 60 is formed from a material having high magnetic permeability. Preferably, the holder 60 is formed from a resin material. In one example, the holder 60 and the second portion 58 are formed integrally with each other as a one-piece member. The holder 60 holds the magnetism generator 52. The holder 60 includes an accommodation portion 68 that accommodates the magnetism generator 52. The accommodation portion 68 accommodates the magnetism generator 52 so that the magnetism generator 52 is not exposed from an end of the disc brake rotor 20 at the side of one end surface 68A. The accommodation portion 68 includes a hole 70 used to accommodate the magnetism generator 52. The accommodation portion 68 has an opening of the hole 70 at another end surface 68B of the second annular portion 58A with respect to the axial direction. The one end surface 68A is closed. The magnetism generator 52 is accommodated in the hole 70 of the accommodation portion 68. Preferably, the hole 70 of the accommodation portion 68 is sized so that the magnetism generator 52 can be entirely accommodated in the hole 70. The magnetism generator 52 is press-fitted to or adhered by an adhesive agent to the accommodation portion 68 so that the magnetism generator 52 and the accommodation portion 68 cannot be moved relative to each other. In the axial direction of the second annular portion 58A, the accommodation portion 68 is provided on the second portion 58 greatly extending toward one side in the second annular portion 58A. In one example, the other end surface 68B of the accommodation portion 68 overlaps the first annular portion 64 or the second portion 58 in the axial direction of the second annular portion 58A.

As shown in FIG. 4, in a state where the disc brake rotor 20 is coupled to the hub 10 with the first portion 56 of the base 54 located between the disc brake rotor 20 and the hub 10, the holder 60 greatly projects toward the disc brake rotor 20. At least a portion of the holder 60 is configured so that it can be located in one of the through holes 28 of the disc brake rotor 20. The disc brake rotor 20 includes a first surface 20A facing toward the base 54 and a second surface 20B at an opposite side of the first surface 20A. In a state where the disc brake rotor 20 is coupled to the hub 10, the end of the holder 60 at the side of the disc brake rotor 20 in a direction parallel to the axial direction of the hub 10 is configured to be located toward the first surface 20A from the second surface 20B. Thus, the magnetism generation device 50 is not located outward from the disc brake rotor 20 in the widthwise direction of the bicycle B.

As shown in FIG. 1, the magnetism detection sensor S is attached to the bicycle body F. Preferably, the magnetism detection sensor S is attached at a position allowing for detection of changes in the magnetism generated by the magnetism generator 52 in a case where rotation of the wheel of the bicycle body F rotates the magnetism generator 52. In a case where the hub 10 is a front hub, the magnetism detection sensor S is preferably provided on a front fork of the bicycle body F. In a case where the hub 10 is a rear hub, the magnetism detection sensor S is preferably provided on a chain stay or a seat stay of the bicycle body F. Rotation of the wheel rotates the hub shell 14. This rotates the magnetism generation device 50 together with the hub shell 14. During the rotation, the magnetism generator 52 passes by the proximity of the magnetism detection sensor S. Upon detection of magnetism, the magnetism detection sensor S generates a signal or outputs a signal corresponding to the polarity of magnetism. A controller (not shown) is configured to communicate with the magnetism detection sensor S. The controller calculates a detection cycle of the magnetism from the signals output by the magnetism detection sensor S to determine the rotation speed of the wheel. The magnetism detection sensor S includes a reed switch that can be a Hall element or a magnetic reed.

The magnetism generation device 50 is coupled in a removable manner to the hub 10. In a case where the magnetism generation device 50 is removed from the hub 10, the hub 10 can be used as a normal hub 10 including the disc brake rotor 20 in a state where the end surface of the inner circumferential portion of the disc brake rotor 20 is contacting the end surface of the protrusion 14B of the hub 10 at the side of the disc brake rotor 20.

Second Embodiment

A magnetism generation device 80 in accordance with a second embodiment will now be described with reference to FIGS. 7 to 9. The magnetism generation device 80 in accordance with the second embodiment is identical to the magnetism generation device 50 in accordance with the first embodiment except for the addition of a plurality of projections 90. Each of the projections 90 includes a first contact surface 84A and a second contact surface 84B. Same reference numerals are given to those components that are the same as the corresponding components of the first embodiment. Such components will not be described in detail.

Figure 7:
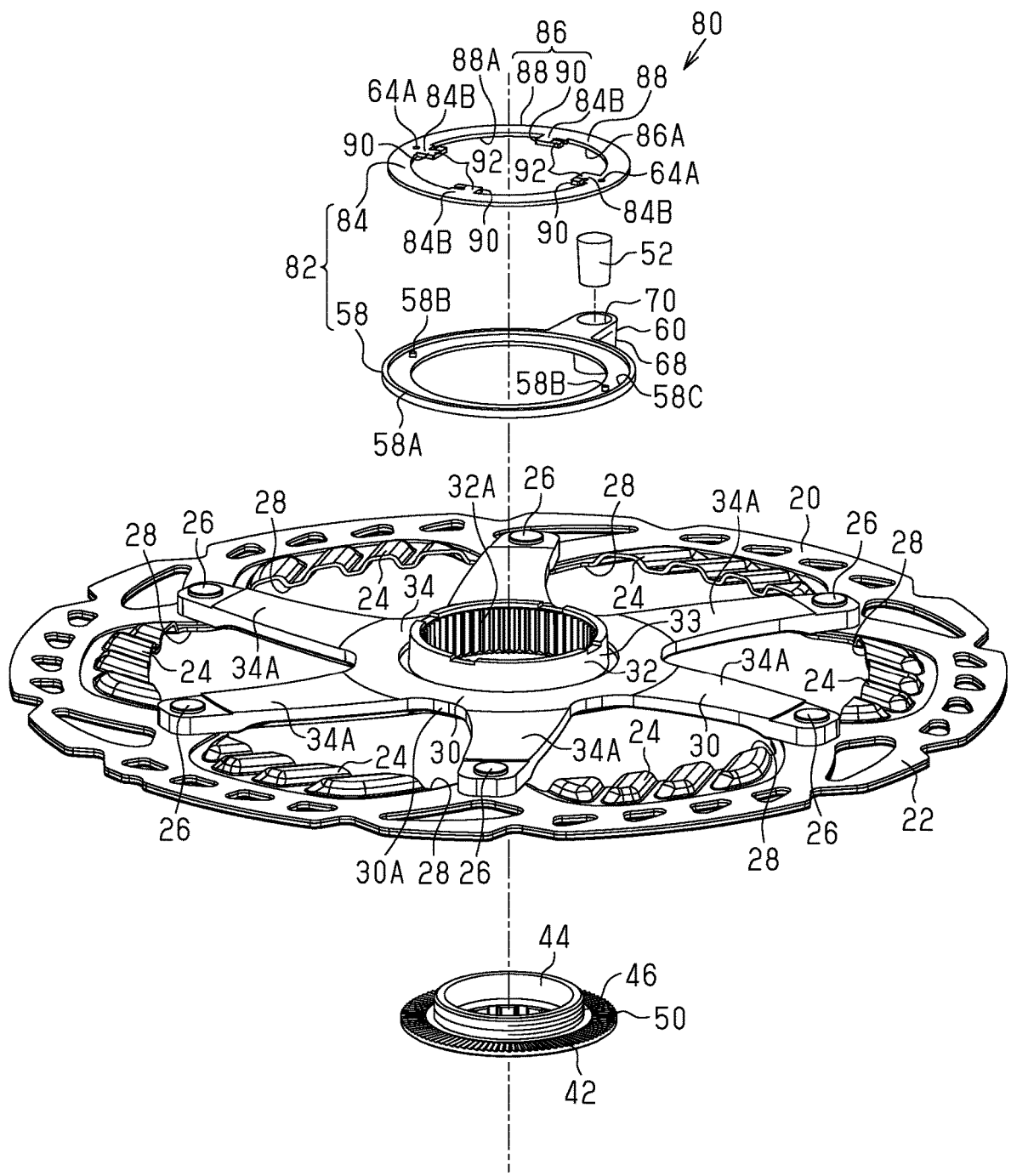
FIG. 7 is an exploded perspective view of the disc brake rotor having a bicycle magnetism generation device in accordance with a second embodiment.

As shown in FIG. 7, the magnetism generation device 80 includes the magnetism generator 52 and a base 82. The base 82 includes a first portion 84, the second portion 58 and the holder 60. The base 82 supports the magnetism generator 52.

In a state where the disc brake rotor 20 is coupled to the hub 10, the first portion 84 is configured to be arranged between the disc brake rotor 20 and the hub 10. In a state where the disc brake rotor 20 is coupled to the hub 10, the first portion 84 of the base 82 is configured to be arranged between the disc brake rotor 20 and the hub 10 in a direction parallel to the axial direction of the hub 10.

The first portion 84 includes the first contact surface 84A and the second contact surface 84B. The base 82 includes a plate member 86. The first portion 84 includes at least part of the plate member 86. The plate member 86 includes a third annular portion 88 and the projections 90. The plate member 86 has a thickness selected from the range of 0.2 mm or greater and 1.5 mm or less. The thickness of the plate member 86 is preferably selected from the range of 0.2 mm or greater and 0.8 mm or less. The thickness of the plate member 86 is further preferably selected from the range of 0.2 mm or greater and 0.5 mm or less. The third annular portion 88 allows for the insertion of part of the hub 10 in the axial direction of the hub 10. The third annular portion 88 corresponds to "the annular portion that allows for insertion of part of the hub 10 in an axial direction of the hub 10." The plate member 86 includes a hole 86A allowing for insertion of a part of the hub 10. The hole 86A is formed including a center area of the plate member 86. The third annular portion 88 is formed integrally with the projections 90 as a one-piece member. The first portion 84 includes the projections 90. Preferably, the third annular portion 88 is ring-shaped.

The projections 90 project inward in the radial direction from an inner circumferential portion 88A of the third annular portion 88. The projections 90 are spaced apart from one another in a circumferential direction of the third annular portion 88. For example, four projections 90 are provided at equal intervals in the circumferential direction. The projections 90 each include a leaf spring 92. The third annular portion 88 is identical in shape to the outer circumferential portion of the first annular portion 64 in the first embodiment. The third annular portion 88 has an inner diameter that is greater than or equal to that of the second annular portion 58A. Preferably, the inner diameter of the third annular portion 88 is equal to the inner diameter of the second annular portion 58A. The third annular portion 88 is coaxial with the second annular portion 58A and held by the second annular portion 58A. The projections 90 project inward in the radial direction from the inner circumferential portion of the third annular portion 88. In the same manner as the first annular portion 64, the third annular portion 88 is fixed to the second annular portion 58A.

Figure 8:
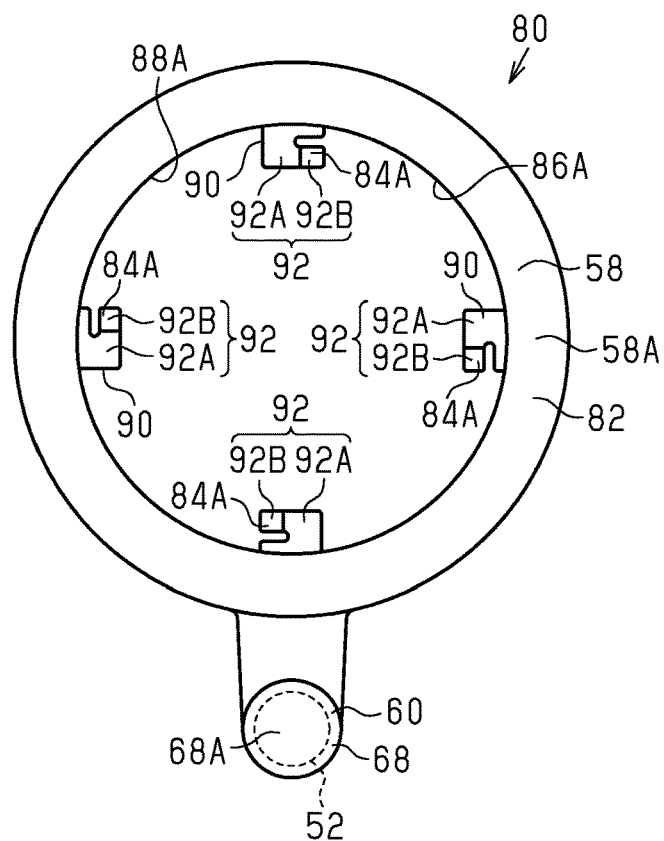
FIG. 8 is a side elevational view of the bicycle magnetism generation device shown in FIG. 7.

As shown in FIG. 8, each of the leaf springs 92 includes a planar portion 92A and an inclined portion 92B. The planar portion 92A is continuous with the inner circumferential portion 88A of the third annular portion 88. The inclined portion 92B is continuous with the planar portion 92A and located on one side of the planar portion 92A about the axis of the third annular portion 88. The inclined portion 92B is inclined toward one side in the axial direction of the third annular portion 88. The inclined portion 92B includes a free end that projects toward the hub 10 from the planar portion 92A.

Each of the projections 90 includes the first contact surface 84A and the second contact surface 84B. The first contact surface 84A and the second contact surface 84B are provided on the leaf springs 92. More specifically, the first contact surface 84A is provided on the planar portions 92A, and the second contact surface 84B is provided on the inclined portions 92B. The free ends of the inclined portions 92B can be projected toward the disc brake rotor 20 from the planar portions 92A. In such a case, the first contact surface 84A is provided on the inclined portions 92B, and the second contact surface 84B is provided on the planar portions 92A.

Figure 9:
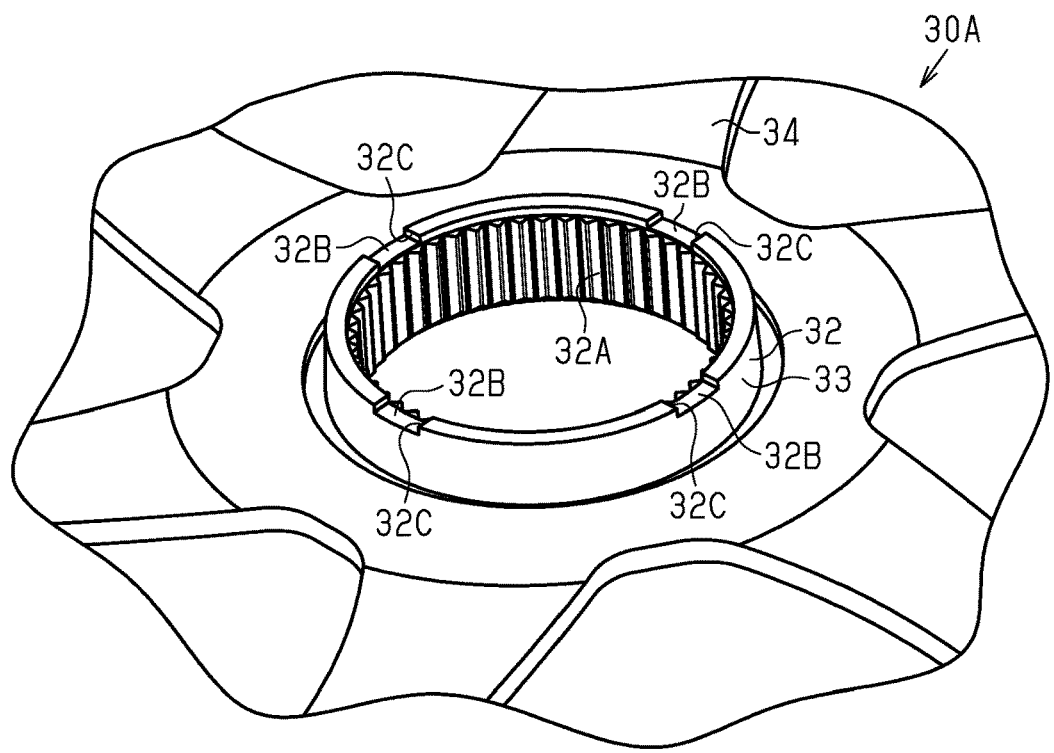
FIG. 9 is an enlarged perspective view of a portion of the disc brake rotor shown in FIG. 7.

As shown in FIG. 9, the disc brake rotor 20 includes an adapter 30A. The inner circumferential portion 32 of the adapter 30A includes a plurality of cutouts or grooves 32C. In a state where the adapter 30A is coupled to the hub 10, the first portion 84 of the base 82 is arranged between the grooves 32C and the hub 10. The grooves 32C are formed on one side of the inner circumferential portion 32 of the adapter 30A in the axial direction of the disc brake rotor 20.

More specifically, the grooves 32C are formed on the projection 33 of the adapter 30A in the end surface located at the side of the hub shell 14. Preferably, the number of the grooves 32C is the same as the number of the projections 90. The grooves 32C are formed at locations corresponding to the projections 90. Each of the grooves 32C in the disc brake adapter 30A has a circumferential width that is 2 mm or greater. Preferably, the circumferential width of each of the grooves 32C in the disc brake adapter 30A is 10 mm or less. Each of the grooves 32C has a depth selected from the range of 0.1 mm or greater to 2 mm or less. Preferably, the depth of the grooves 32C is selected to be greater than or equal to the thickness of the plate member 86. In a state where the disc brake rotor 20 is coupled to the hub 10, the first contact surface 84A contacts the protrusion 14B of the hub 10 (refer to FIG. 4). In a state where the disc brake rotor 20 is coupled to the hub 10, the second contact surface 84B contacts the bottom surface of the corresponding groove 32C. The depths of the grooves 32C are greater than the thickness of the plate member 86. Thus, in a state where the disc brake rotor 20 is coupled to the hub 10, the inner circumferential portion of the disc brake rotor 20 can be fixed in contact with the protrusion 14B of the hub shell 14. Even though the depths of the grooves 32C are greater than the thickness of the plate member 86, the projection amounts of the free ends of the inclined portions 92B in each of the leaf springs 92 can be greater than the depths of the grooves 32C to allow for stable holding of the magnetism generation device 80.

Third Embodiment

A magnetism generation device 50A in accordance with a third embodiment will now be described with reference to FIGS. 10 and 11. The magnetism generation device 50A in accordance with the third embodiment is identical to the magnetism generation device 50 in accordance with the first embodiment except for modifications to the structures forming a magnetism generator 94 and a plurality of holders 98. Same reference numerals are given to those components that are the same as the corresponding components of the first embodiment. Such components will not be described in detail.

Figure 10:
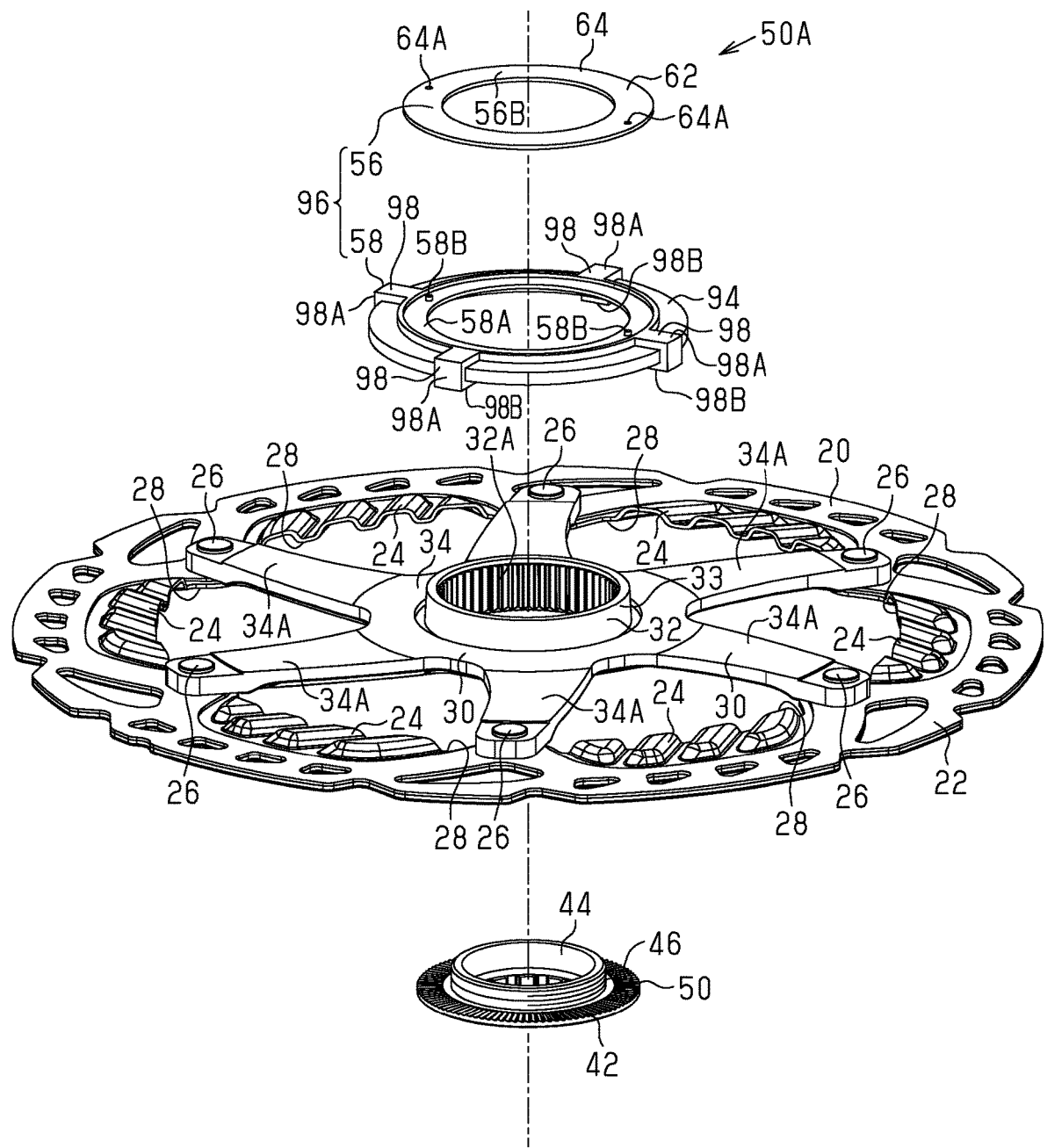
FIG. 10 is an exploded perspective view of the disc brake rotor having a bicycle magnetism generation device in accordance with a third embodiment.

As shown in FIG. 10, the magnetism generation device 50A includes the magnetism generator 94 and a base 96. The base 96 includes the first portion 56, the second portion 58 and the holders 98. The magnetism generator 94 generates magnetism. The magnetism generator 94 includes at least one permanent magnet. The magnetism generator 94 is annular. Preferably, the magnetism generator 94 is annular. As shown in FIG. 11, the magnetism generator 94 includes a plurality of magnetic poles in the circumferential direction. Preferably, magnetic poles of different polarities are alternately arranged in the circumferential direction.

As shown in FIG. 10, the second portion 58 is provided with the holders 98 to hold the magnetism generator 94. The holders 98 are attached to the outer circumferential portion of the second portion 58. Preferably, the holders 98 are formed from a material having high magnetic permeability. Preferably, the holders 98 are formed from a resin material. In one example, the holders 98 are formed integrally with the second portion 58 as a one-piece member. The holders 98 are provided in the circumferential direction of the second portion 58. Each of the holders 98 includes an arm 98A and a claw 98B. The arms 98A extend outward in the radial direction from the outer circumferential portion of the second portion 58, and the claws 98B are engageable with the magnetism generator 94. The arms 98A contact one end of the magnetism generator 94 in the axial direction of the second annular portion 58A. The claws 98B contact an outer circumferential portion of the magnetism generator 94 from an outer side in the radial direction. Further, the claws 98B are formed to hold the outer circumferential portion of the magnetism generator 94 with the arms 98A in the axial direction of the second annular portion 58A. Preferably, the magnetism generator 52 and the holders 98 are coupled by an adhesive agent or the like so that the magnetism generator 52 cannot be moved relative to and the holders 98. The magnetism generator 52 and the holders 98 are fixed to each other by coupling members such as bolts and rivets. The holders 98 are not limited to the illustrated shape as long as the magnetism generator 94 can be held. The holders 98 can be configured to accommodate the magnetism generator 94. For example, the holders 98 can be molded with the magnetism generator 94.

Figure 11:
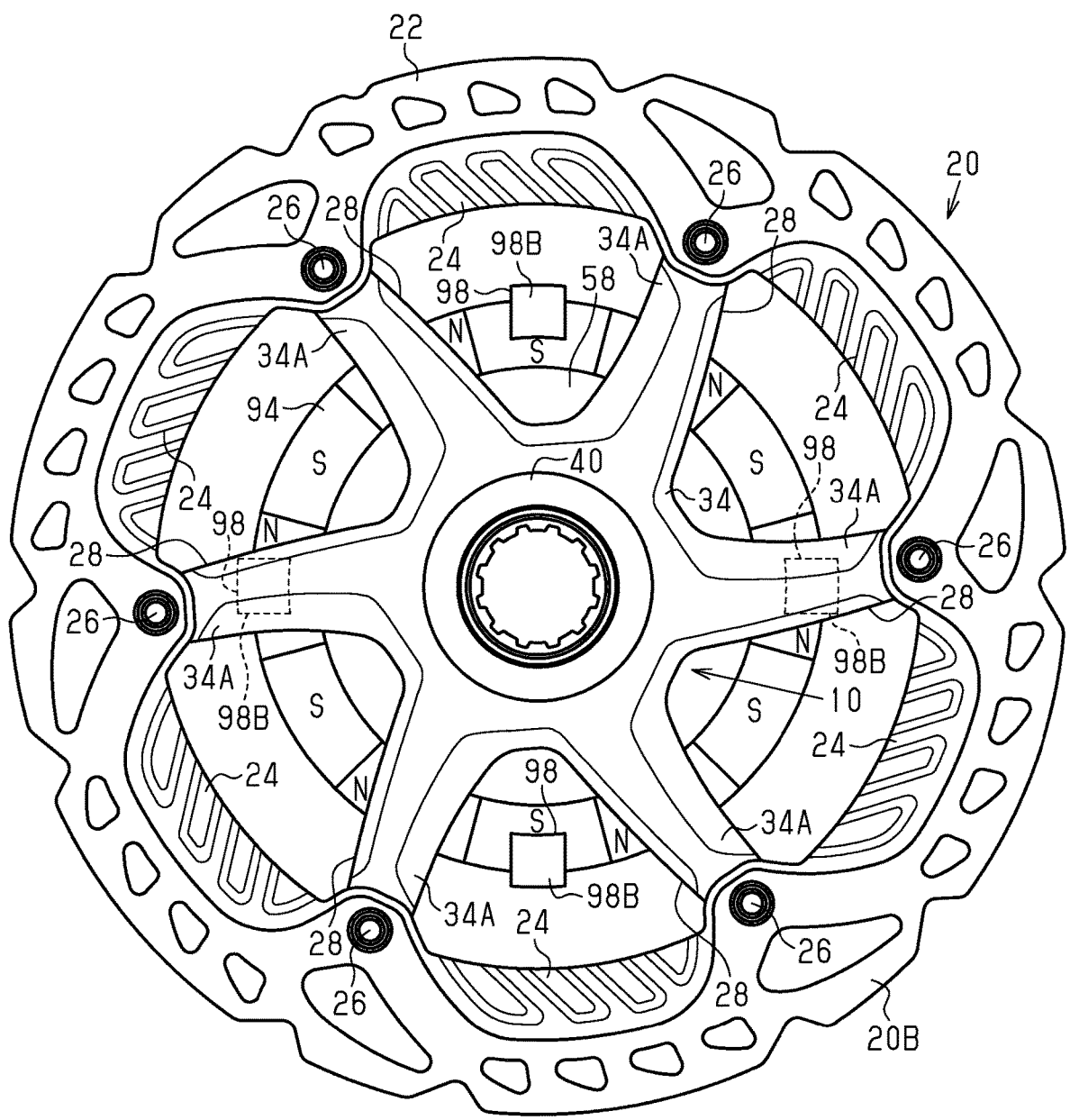
FIG. 11 is a side elevational view of the disc brake rotor and the bicycle magnetism generation device shown in FIG. 10.

As shown in FIG. 11, the magnetism generator 94 has an outer diameter set so that at least portions of the magnetism generator 94 are arranged at locations corresponding to the through holes 28 of the disc brake rotor 20. Preferably, the outer diameter of the magnetism generator 94 is selected so that the magnetism generator 94 is arranged inward in the radial direction from the connection members 26. In this case, the disc brake adapter 30 is formed from a material having high magnetic permeability such as aluminum to facilitate detection of magnetic flux. The magnetism detection sensor S (refer to FIG. 1) is configured to allow for detection of the polarity that is reversed whenever a different magnetic pole passes by during rotation of the magnetism generator 94 as the disc brake rotor 20 rotates.

The holders 98 can be configured to pass through the through holes 28 of the disc brake rotor 20 and hold the magnetism generator 94 outward in the widthwise direction of the bicycle B from the disc brake rotor 20. In this case, preferably, the arms 98A are configured to pass through the through holes 28 of the disc brake rotor 20, and the magnetism generator 94 is held by the holders 60 in a removable manner. For example, each of the claws 98B can be formed by the portion of the corresponding arm 98A passing through the corresponding through hole 28 of the disc brake rotor 20 and located outward in the widthwise direction of the bicycle B from the disc brake rotor 20, and the claw 98B can engage and hold the magnetism generator 94. Further, the portion of the arms 98A passing through the corresponding through hole 28 of the disc brake rotor 20 and located outward in the widthwise direction of the bicycle B from the disc brake rotor 20 can include a threaded hole or a hole. In this case, bolts are inserted through holes of the magnetism generator 94 and fastened to the threaded holes of the arms 98A. Alternatively, bolts inserted through holes of the arms 98A can be fastened to a nut. The magnetism generator 94 can be configured to include a magnet and a cover member covering the magnet, and the cover member can include a hole for passage of a bolt.

Modifications

The present invention is not limited to the foregoing embodiment and various changes and modifications of its components can be made without departing from the scope of the present invention. Also, the components disclosed in the embodiment can be assembled in any combination for embodying the present invention. For example, some of the components can be omitted from all components disclosed in the embodiment. Further, several of the modified examples described below can be combined.

In the magnetism generation device 80 in accordance with the second embodiment, the leaf springs 92 can be omitted, and the projections 90 can be formed to be planar. In the disc brake rotor 20 of the second embodiment, the grooves 32C of the inner circumferential portion 32 can be omitted.

The magnetism generation devices 50, 50A and 80 of the above embodiments can be at least partially arranged in the radial direction between the disc brake rotor 20 and the hub 10. Further, a magnetism generation device can be configured to include, in the radial direction of the hub axle 12, a base, which is located between the disc brake rotor 20 and the hub 10, and a magnetism generator, which is held by the base. In this case, the magnetism generation device can be entirely located between the disc brake rotor 20 and the hub 10. The base is annular and includes an inner circumferential portion provided with a first engagement portion engaged with the splines 18A of the hub 10 and an outer circumferential portion provided with a second engagement portion engaged with the splines 32A of the disc brake rotor 20. The base holds the magnetism generator between the disc brake rotor 20 and the hub 10. In this case, it is preferred that the base be formed from a metal having high magnetic permeability. Further, the magnetism generator can be a permanent magnet as shown in FIG. 3 or an annular magnet as shown in FIG. 11. In addition, the fixing member 40 and the protrusion 14B of the hub shell 14 can have diameters that are larger than that of the base. The fixing member 40 and the protrusion 14B of the hub shell 14 can be sized so that the base and the inner circumferential portion of the disc brake rotor 20 are held between the fixing member 40 and the protrusion 14B of the hub shell 14. The base can be formed integrally with the magnetism generator as a one-piece member. Further, the base can be formed from a material that generates magnetism so that the base functions as the magnetism generator.

The bases 54, 82 and 96 of the magnetism generation devices 50, 50A and 80 in the above embodiments can be configured to generate magnetism. In this case, the magnetism generation devices 50, 50A and 80 can entirely be formed as a magnetism generator.

The magnetism generators 52 and 94 of the above embodiments can be replaced by magnetism generators that are at least partially magnetized. Further, in a case where the bases 54, 82 and 96 are formed from metal including a magnetic body, the bases 54, 82, and 96 can be partially magnetized to configure the magnetism generators 52 and 94.

The magnetism generators 52 and 94 can each be configured to include a magnet. In this case, preferably, the magnetism generation devices 50, 50A and 80 each include a coil, a power supply supplying the coil with power, and a control unit controlling the power supplied to the coil. In a case where the magnetism generators 52 and 94 each include an electromagnet, the hub 10 can be provided with a dynamo, and the dynamo can supply power to a coil of the electromagnet.

In the first embodiment, the end of the holder 60 at the one end surface 68A can be open. Further, the end of the holder 60 at the side of the hub 10 can be closed. The magnetism generator 52 can be formed integrally with the holder 60, and the magnetism generator 52 can be embedded in the holder 60. The holder 60 can be omitted from the accommodation portion 68, and the magnetism generator 52 can be attached to the holder 60, which has the form of a plate, with an adhesive agent. The holder 60 can be omitted, and the magnetism generator 52 can be attached to the second portion 58 by an adhesive agent or the like.

The bases 54, 82 and 96 do not have to include the first annular portion 64 and the third annular portion 88. For example, the base 54 can have a square shape. The base 54 is at least partially held between the protrusion 14B of the hub 10 and the projection 33 of the disc brake rotor 20 to couple the base 54 to the hub 10.

The first annular portion 64 and the third annular portion 88 can be formed in a non-continuous manner around the hub axle 12. At least one of the first contact surface 56A and the second contact surface 56B can include a recess and a projection instead of being planar. In a case where the second contact surface 56B includes a recess and a projection, the portion of the hub 10 that contacts the second contact surface 56B can be shaped in correspondence with the recess and projection of the second contact surface 56B.

The base 82 of the second embodiment does not have to contact at least one of the hub 10 and the disc brake rotor 20. For example, the size of the projections 90 in the axial direction of the disc brake rotor 20 can be smaller than the depth of the grooves 32C in the disc brake rotor 20 so that only one of the surfaces of the projections 90 facing toward the hub 10 and the disc brake rotor 20 contacts the hub 10 or the disc brake rotor 20.

The present invention can be applied to a disc brake rotor 120 that does not include the disc brake adapter 30. The disc brake rotor 120 shown in FIG. 12 includes an outer circumferential portion 122, an inner circumferential portion 124 located inward in the radial direction from the outer circumferential portion 122, and a plurality of connection portions 126 connecting the outer circumferential portion 122 and the inner circumferential portion 124. Preferably, the outer circumferential portion 122, the inner circumferential portion 124, and the connection portions 126 are formed integrally with one another as a one-piece member. The outer circumferential portion 122 is configured to contact brake pads of a disc brake caliper. Coupling members 128 couple the disc brake rotor 120 to a hub (not shown) of the disc brake rotor 120. In one example, the coupling members 128 include a plurality of bolts. The inner circumferential portion 124 includes a plurality of holes 124A into which the coupling members 128 are inserted to fix the disc brake rotor 120 to a hub shell of the hub. The hub includes coupling portions that can be coupled to the coupling members 128. The coupling portions include a plurality of threaded holes. A spacer Si is arranged between the heads of the coupling members 128 and the disc brake rotor 20. The spacer Si can be omitted. A base 132 of a magnetism generation device 130 includes a plate member 134. The plate member 134 includes holes 134A allowing for the insertion of the coupling members 128. There is a plurality of the holes 134A. The plate member 134 is annular. The holder 60 is provided on the outer circumferential portion of the plate member 134. The plate member 134 has the same shape as the second portion 58 except for the recess 58C. The plate member 134 is formed integrally with the holder 60 as a one-piece member. Preferably, the plate member 134 is formed from a resin material. The base 132 of the magnetism generation device 130 is held between the hub shell 14 and the inner circumferential portion 124 of the disc brake rotor 120. At least part of the holder 60 is arranged in a through hole 120A extending between adjacent ones of the connection portions 126.

In the above modified example, the plate member 134 does not have to be annular. The plate member 134 can have any shape as long as it includes a plurality of holes 134A for insertion of the coupling members 128. Preferably, the plate member 134 includes two of the holes 134A for the insertion of adjacent ones of the coupling members 128.

Figure 12:
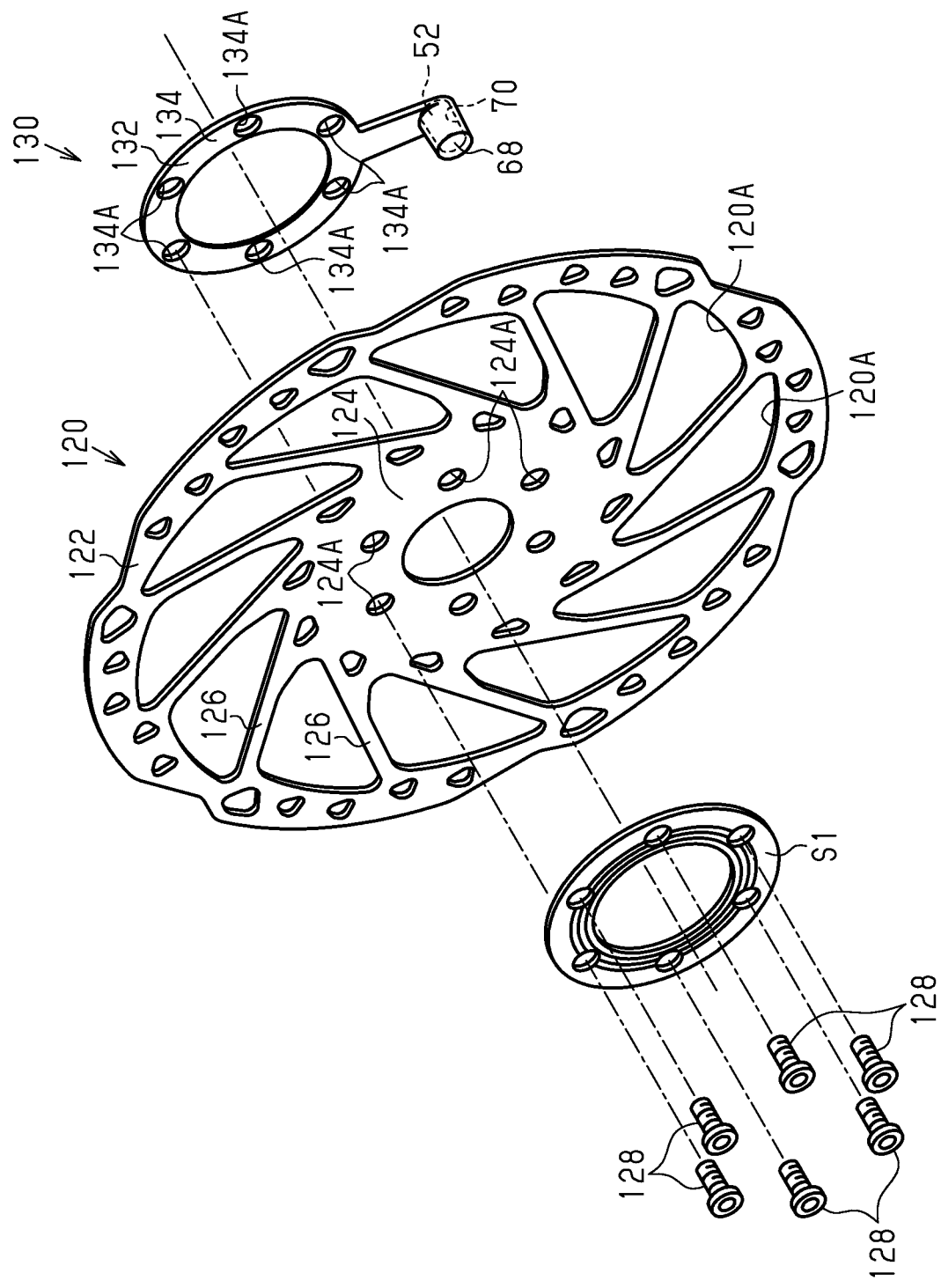
FIG. 12 is an exploded perspective view showing the disc brake rotor having a bicycle magnetism generation device in accordance with an alternative second modification.

In the modified example shown in FIG. 12, the plate member 134 can include a plurality of recesses instead of the holes 134A. The recesses are recessed outward in the radial direction or inward in the radial direction of the hub axle 12 to allow for the passage of the coupling members 128. Further, instead of forming the holes 134A in the plate member 134, the plate member 134 can have an outer diameter set so that the distance from the axis of the hub axle 12 to the outer circumference of the plate member 134 is smaller than the distance from the axis of the hub axle 12 to where the coupling members 128 pass. Alternatively, the plate member 134 can have an inner diameter so that the distance from the axis of the hub axle 12 to the inner circumference of the plate member 134 is larger than the distance from the axis of the hub axle 12 to where the coupling members 128 pass. In such cases, at least part of the plate member 134 is arranged between the disc brake rotor 120 and the hub inward or outward in the radial direction from where the coupling members 128 pass by.

In the magnetism generation device 50 of the first embodiment, the magnetism generation device 80 of the second embodiment, and the modified example of FIG. 12, in a state where the disc brake rotor 20 is coupled to the hub 10, the end of the holder 60 at the side of the disc brake rotor 20 in a direction parallel to the axial direction of the hub 10 can be configured to be inserted through the through holes 28 and 120A of the disc brake rotor 20 in a direction parallel to the axial direction of the hub 10 and arranged outward in the widthwise direction of the bicycle from the second surface 20B.

The magnetism generation device 50 of the first embodiment, the magnetism generation device 80 of the second embodiment, and the modified example of FIG. 12 can be provided with a plurality of the holders 60 and 98. Preferably, the holders 60 and 98 are arranged at equal intervals around the hub axle 12. Preferably, the polarities of the magnetic poles of the magnetism generators 52 and 94 held by adjacent ones of the holders 60 and 98 around the hub axle 12 alternately differ in the circumferential direction.

What is claimed is:

1. A bicycle magnetism generation device comprising:
a magnetism generator generating magnetism, wherein in a state where a disc brake rotor is coupled to a hub of a bicycle, the bicycle magnetism generation device is configured to be at least partially arrangeable between the disc brake rotor and the hub; and
a base supporting the magnetism generator, the base including at least a first portion configured to be at least partially arrangeable between the disc brake rotor and the hub in a state where the disc brake rotor is coupled to the hub, the first portion of the base including a plate member, the plate member including a holder that holds the magnetism generator, the holder being arrangeable between the disc brake rotor and the hub in the state where the disc brake rotor is coupled to the hub.

2. The bicycle magnetism generation device according to claim 1, wherein
the first portion of the base is configured to be arrangeable between the disc brake rotor and the hub in a direction parallel to an axial direction of the hub in a state where the disc brake rotor is coupled to the hub.

3. The bicycle magnetism generation device according to claim 2, wherein
in a state where the disc brake rotor is coupled to the hub, the first portion of the base includes a first contact surface that contacts the disc brake rotor and a second contact surface that contacts the hub.

4. The bicycle magnetism generation device according to claim 3, wherein
the plate member includes an annular portion allowing for insertion of a part of the hub in an axial direction of the hub, and
the first contact surface and the second contact surface are defined on the annular portion.

5. The bicycle magnetism generation device according to claim 3, wherein
at least one of the first contact surface and the second contact surface is planar.

6. The bicycle magnetism generation device according to claim 1, wherein
the plate member includes
an annular portion allowing for insertion of a part of the hub in an axial direction of the hub, and
a projection projecting inward in a radial direction from an inner circumferential portion of the annular portion;
the first contact surface and the second contact surface are defined on the projection.

7. The bicycle magnetism generation device according to claim 6, wherein
the projection is one of a plurality of projections spaced apart by an interval in a circumferential direction of the annular portion.

8. The bicycle magnetism generation device according to claim 6, wherein
the projection includes a leaf spring, and
the first contact surface and the second contact surface are provided on the leaf spring.

9. The bicycle magnetism generation device according to claim 1, wherein
the plate member includes a hole allowing for insertion of a coupling member coupling the disc brake rotor and the hub.

10. The bicycle magnetism generation device according to claim 1, wherein
the plate member has a thickness selected from a range of 0.2 mm or greater and 1.5 mm or less.

11. The bicycle magnetism generation device according to claim 1, wherein
the base further includes a second portion arranged outward in a radial direction of the first portion with respect to a rotational axis of the hub in a state where the first portion of the base is arranged between the disc brake rotor and the huh with the disc brake rotor coupled to the hub, and
the holder is provided on the second portion.

12. The bicycle magnetism generation device according to claim 11, wherein
the holder projects toward the disc brake rotor in a state where the first portion of the base is arranged between the disc brake rotor and the huh with the disc brake rotor coupled to the hub.

13. The bicycle magnetism generation device according to claim 1, wherein
the holder includes an accommodation portion that accommodate the magnetism generator.

14. The bicycle magnetism generation device according to claim 1, wherein
the disc brake rotor includes a through hole extending through the disc brake rotor in a direction a rotational axis of the disc brake rotor extends, and
the holder is configured to be at least partially arrangeable in the through hole.

15. The bicycle magnetism generation device according to claim 14, wherein
the disc brake rotor includes a first surface facing toward the base and a second surface at an opposite side of the first surface;
in a state where the disc brake rotor is coupled to the hub, an end of the holder at a side of the disc brake rotor in a direction parallel to an axial direction of the hub is configured to be located toward the first surface from the second surface.

16. The bicycle magnetism generation device according to a claim 1, wherein
the magnetism generator includes at least one permanent magnet.

17. A bicycle magnetism generation device comprising:
a magnetism generator generating magnetism, wherein in a state where a disc brake rotor is coupled to a hub of a bicycle, the bicycle magnetism generation device is configured to be at least partially arrangeable between the disc brake rotor and the hub; and
a base supporting the magnetism generator, the base including at least a first portion configured to be at least partially arrangeable between the disc brake rotor and the hub in a state where the disc brake rotor is coupled to the hub, the base further including a holder that holds the magnetism generator, the holder including an accommodation portion that accommodate the magnetism generator, the accommodation portion accommodating the magnetism generator so that the magnetism generator is unexposed from an end at a side of the disc brake rotor, the holder being arrangeable between the disc brake rotor and the hub in the state where the disc brake rotor is coupled to the hub.

18. A bicycle magnetism generation device comprising:
a magnetism generator that generates magnetism; and
a base supporting the magnetism generator, wherein in a state where a disc brake rotor including a through hole extending in a direction that a rotational axis extends is coupled to a hub of a bicycle, at least one of the magnetism generator and the base is configured to be at least partially arrangeable in the through hole, the base including a holder that holds the magnetism generator, the holder being arrangeable between the disc brake rotor and the hub in the state where the disc brake rotor is coupled to the hub.

* * * * *